UNITED STATES PATENT OFFICE.

FRANK ADELBERT CRANDALL, OF CHICAGO, ILLINOIS, ASSIGNOR TO IRENE JEAN CRANDALL, OF CHICAGO, ILLINOIS.

POLISHING COMPOSITION.

1,232,460.

Specification of Letters Patent.   Patented July 3, 1917.

No Drawing.   Application filed February 1, 1917.   Serial No. 145,932.

*To all whom it may concern:*

Be it known that I, FRANK A. CRANDALL, a citizen of the United States, residing at 2034 Indiana avenue, Chicago, in the county of Cook and State of Illinois, have invented a new and useful polishing composition to be used in building up a smooth surface on automobiles, cars, implements, machinery, woodwork, and the like where a smooth hard surface is desired, of which the following is a specification.

The herein described composition of matter can be used for filling checks and other defects caused by the action of the weather on old paint and also for improving the surface of wood, metal, stone and cement and coating leather, canvas and window shades.

The composition is waterproof and is not injured by exposure to the weather.

The composition is of a pasty consistency and consists of elastic rubbing varnish, soap stone, zinc oxid, plaster of Paris, linseed oil, dextrin, spirits of turpentine and japan.

I find the following formula and method of mixing gives the best results:

|  | Lbs. |
|---|---|
| Elastic rubbing varnish | 43 |
| Soap stone | 18 |
| Zinc oxid | 15½ |
| Plaster of Paris | 15½ |
| Linseed oil | 3 |
| Dextrin | 2½ |
| Spirits of turpentine | 1½ |
| Japan | 1 |
|  | 100 |

The above composition of matter produces the composition in the white or cream color. By the addition of coloring matter any desired color can be obtained.

The above mentioned ingredients may be combined as follows:

The zinc oxid, plaster of Paris, soap stone and dextrin, commingled together by using any mixing machine. Then the whole mass, liquids and powders may be put through any paint grinding machine.

I am aware that plaster of Paris and dextrin have been used before, but I am not aware that plaster of Paris and dextrin have been used in connection with rubbing varnish, zinc oxid, spirits of turpentine, linseed oil, soap stone and japan.

What I claim and desire to secure by Letters Patent of the United States is:

A polishing composition, consisting of elastic rubbing varnish, soap stone, zinc oxid, plaster of Paris, linseed oil, dextrin, spirits of turpentine and japan, approximately in the proportions described.

In testimony whereof I have signed my name to the specification in the presence of two subscribing witnesses.

FRANK ADELBERT CRANDALL.

Witnesses:
 EDNA YOUNG,
 G. COUDRAY.